United States Patent [19]

Elser et al.

[11] Patent Number: 4,848,402
[45] Date of Patent: Jul. 18, 1989

[54] ROTARY SLIDE VALVE FOR HYDRAULIC AUXILIARY POWER STEERINGS

[75] Inventors: Dieter Elser, Essingen; Helmut Hetzel; Manfred Keller, both of Schwäbisch Gmünd, all of Fed. Rep. of Germany

[73] Assignee: Zahnradfabrik Friedrichshafen, AG., Friedrichshafen, Fed. Rep. of Germany

[21] Appl. No.: 946,710

[22] PCT Filed: Mar. 26, 1986

[86] PCT No.: PCT/EP86/00181
    § 371 Date: Dec. 4, 1986
    § 102(e) Date: Dec. 4, 1986

[87] PCT Pub. No.: WO86/06228
    PCT Pub. Date: Oct. 23, 1986

[30] Foreign Application Priority Data

Apr. 24, 1985 [WO] PCT Int'l Appl. ........... PCT/EP85/00158

[51] Int. Cl.⁴ .................................. F16K 11/085
[52] U.S. Cl. .................. 137/625.23; 137/625.24; 91/375 R
[58] Field of Search .............. 137/625.21, 625.22, 137/625.23, 625.24; 91/375 R, 375 A

[56] References Cited

U.S. PATENT DOCUMENTS

| | | | |
|---|---|---|---|
| 4,063,490 | 12/1977 | Duffy | 91/375 A X |
| 4,285,366 | 8/1981 | Elser | 137/625.23 |
| 4,335,749 | 6/1982 | Walter | 137/625.22 |
| 4,353,288 | 10/1982 | Holub | 91/375 A |
| 4,452,274 | 6/1984 | Haga | 137/625.22 |
| 4,561,516 | 12/1955 | Bishop | 91/375 A X |

*Primary Examiner*—Alan Cohan
*Attorney, Agent, or Firm*—Albert M. Zalkind

[57] ABSTRACT

A rotary valve assembly having a valve sleeve and a rotary valve core are provided with flow control grooves having control edges distributed over the peripheries for regulation of pressurized fluid. Such pressure regulation occurs at the control edges forming sets of three gaps in each rotational direction of the steering control valve. One of such gaps forms a relatively deep return flow passage that is fully opened in the neutral position of the valve assembly and two throttle gaps on opposite sides thereof that are relatively shallow for restricted return flow. Rotational displacement of the valve core initially effects pressure regulation through the intermediate deep gap within a low pressure range. Continued rotation of the rotary valve core effects pressure regulation within a high pressure range by return flow through the other gaps conducting restricted flow, to both continue pressure regulation within the high pressure range and suppress hissing noises developed in response to entry of pressurized fluid.

7 Claims, 3 Drawing Sheets

FIG. 1
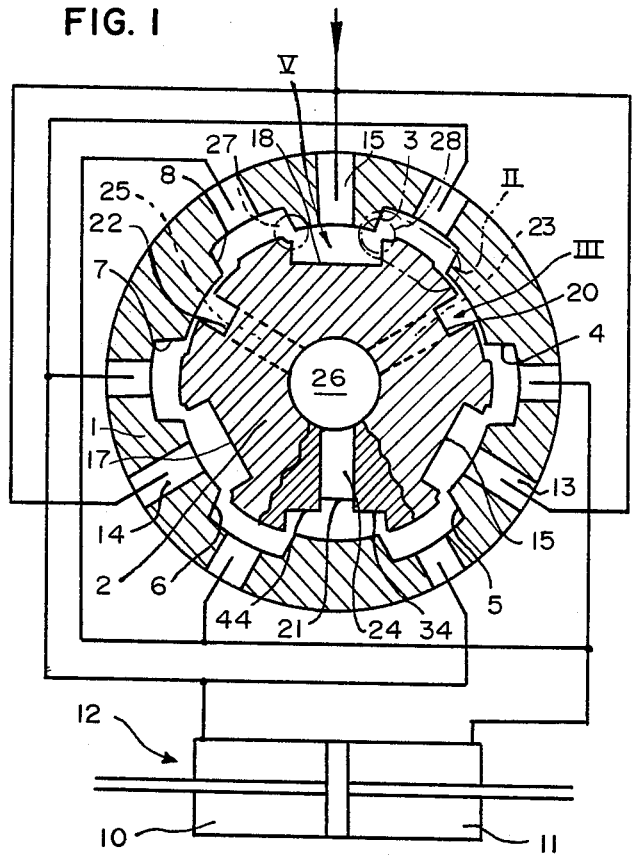
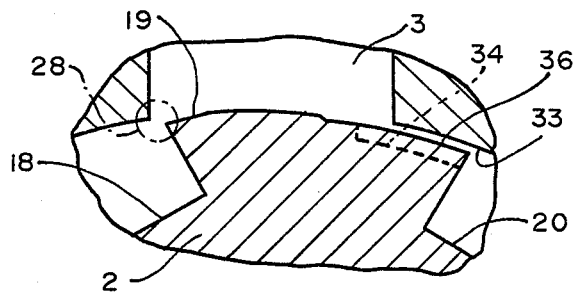
FIG. 2

ROTARY SLIDE VALVE FOR HYDRAULIC AUXILIARY POWER STEERINGS

BACKGROUND OF THE INVENTION

This invention relates generally to a rotatable control valve assembly for an auxiliary hydraulic power steering system in an automotive vehicle.

Rotatable controls valve for standard hydraulic power steering systems develop so called hissing noises at the valve control edges. The loudness of such noises depend on the ratio of pressures upstream and downstream of the control edges. Also, such noises become louder as the fluid pressure head increases and the noise is transmitted through the conventional metallic drive connection between the vehicle steering wheel and the steering control valve.

A rotary steering control valve having means for eliminating hissing noises developed at the valve control edges, is already known as disclosed in U.S. Pat. No. 4,335,749 to Walter owned in common with the present application. Such control valve is so constructed that inlet control edges located directly downstream of inlet bores raise pump pressure continuously to the requisite operating pressure level. Such inlet control edges are provided with bevel surfaces or champfers for control of pressure. With respect to pressure control by the rotatable core valve member involved, pressurize fluid or oil is regulated within three control grooves of a coacting valve sleeve, such grooves being respectively relieved through three of six inlet control edges, by way of example. The other three inlet control edges establish an unrestricted flow path to another groove in the valve sleeve in fluid communication with an active servomotor pressure chamber. The volume of fluid displaced from the servomotor is always conducted through the the aforementioned control grooves, pressure relieved through six constant flow throttling passages formed as bores in fluid communication with the oil reservoir tank through additional valve sleeve grooves for return flow. The throttling passage bores are responsible for pressure build-up of fluid under control of the three control edges to regulate diversion of a portion of the pump inflow stream to the accumulated return flow paths, thereby significantly decreasing any reduction in pressure at such inlet control edges. Disturbing noises otherwise developed from the inflow of pressurized fluid is thus avoided. However, the accumulation of return flow fluid in the flow modulating positions of rotary core valve member, increases energy imbalance accommodating an increase of pressure build-up in the active pressure chamber of the servomotor to overcome the return flow accumulation. Further, the formation of parallel throttle passages in the core valve member and the additional grooves for return flow, are responsible for relatively high production costs.

It is therefore an important object of the invention to provide a rotatable valve assembly for a hydraulic steering control system of aforementioned type which operates without hissing noises, and yet avoids accumulation of return flow fluid from the servomotor chamber opposing the activated pressure chamber thereof during steering control movement.

Yet another object of the invention, in accordance with the foregoing object, is to provide a constructionally simpler control valve assembly.

SUMMARY OF THE INVENTION

In accordance with the present invention, the rotary core valve of the steering control valve assembly is provided with an elongated return flow groove located upstream of the inlet control edges, in the direction of flow, for control of pressure build-up in the servomotor pressure chamber in association with a deep gap along a portion of its axial length in both rotational directions and with throttle passage gaps or orifice passages spatially separated from the deep gap. The throttle gaps are circumferentially longer in dimensions than the deep gap on both axial sides thereof. The deep gap is furthermore located in the middle of the sides of the return flow grooves. As a result of the foregoing locational arrangement of the gaps, return flow occurs without restriction in the neutral position of the control valve, through a large cross-sectional flow passage area of the deep gap. The flow area of the deep gap is continuously decreased upon displacement of the control valve from the neutral position to regulate pressure within a low pressure range. Upon closing of the deep gap passage in response to further displacement of the control valve, pressure regulation within a high pressure range is achieved through the two throttle gaps. Because of the shallow depth and longer flow lengths of the throttle gaps, restricted laminar flow is conducted therethrough to the return flow grooves. Further, the larger throttle gap lengths decrease the expenditure of pressure energy to regulate release or dampen the noise emitted into the return flow stream.

The deep gap and throttle gap arrangement also enables manufacture of the control valve assembly with favorable cost effectiveness, by use of stamping techniques, for example.

An embodiment of the invention will be described hereinafter in greater detail on the basis of the accompanying drawing.

BRIEF DESCRIPTION OF DRAWING FIGURES

FIG. 1 is a simplified cross section view through a rotary valve of the present invention in a neutral position, with associated flow conduits to a servomotor, schematically illustrated.

FIG. 2 is an enlarged partial section view of a portion (II) of the valve shown in FIG. 1.

DETAILED DESCRIPTION OF PREFERRED EMBODIMENT

Figure 4:
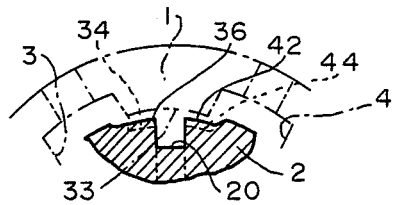
FIG. 4 is a partial section view taken substantionally through a plane indicated by section line IV—IV in FIG. 3.

In FIG. 1, a steering control valve assembly is shown in its neutral position, including a valve sleeve 1 and a rotary core valve member 2. The valve sleeve 1 is formed in a conventional manner by stamping with six flow control edges 3-8, of which three control edges 3, 5 and 7 are exposed through a common conduit to a pressure chamber 10 of a servomotor 12 while the other three control edges 4, 6 and 8 are exposed through another conduit to the opposed servomotor chamber 11. The valve sleeve 1 is also formed with three inlet bores 13, 14 and 15 connected by a supply conduit to a pump (not shown). Control grooves 16, 17 and 18 are formed in the rotary valve core 2, respectively confronting the opposed inlet bores 13, 14 and 15 in the neutral position of the valve core 2 as shown. Additionally, return grooves 20, 21 and 22 are formed in the valve core 2, respectively connencted by radial bores 23, 24 and 25 to a central axial return bore 26, in fluid communication with an oil reservoir tank, not shown. The foregoing pairs of return groove and bore at three circumferentially spaced locations on the valve core member 2, form one return flow system as hereinafter referred to.

Figure 5:
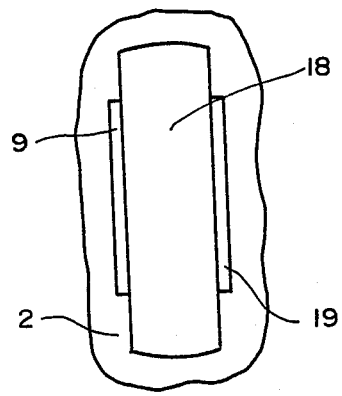
FIG. 5 is a partial top plan view of a portion (V) of the valve shown in FIG. 1.

Between the confronting control groove 18 and inlet bore 15 are inlet control zones 27 and 28. The inlet control zone 28 shown enlarged in FIGS. 2 and 5, includes bevel surfaces 9 and 19 formed on the valve core 2 at control groove 18. These bevel surfaces are made as wide as possible and diverge from the outer peripheral surface of the valve core member 2 toward the bottom of the groove 18. As the valve core member 2 is rotated counterclockwise as viewed in FIG. 2, the gap between the bevel surface 19 and the valve sleeve 1 closes.

Figure 3:
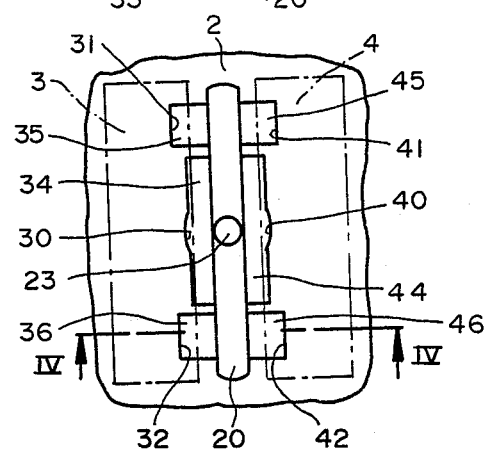
FIG. 3 is a partial top plan view of a portion (III) of the valve shown in FIG. 1.

In accordance with the present invention, the valve core member 2 is provided with surface configurational means rearwardly spaced in one rotational direction from the inlet control zone 28 at the return flow groove 20 as shown in FIGS. 2, 3 and 4, to control pressure build-up. Such surface configuraional means includes indentations 30, 31 and 32 in one side of the return flow groove 20 shown in FIG. 3. The indentation 30 is curved and located intermediate the length of the side of return flow groove 20 between relatively flat indentations 31 and 32 on opposite axial sides thereof. Between each of the indentations 30, 31 and 32 and a land portion of the valve sleeve 1 bridging the return groove 20 shown in FIG. 4, flow gaps are formed. The flow gap 34 between intermediate indentation 30 and the valve sleeve 1 is relatively deep while the flow gaps 35 and 36 respectively formed between indentations 31 and 32 and the valve sleeve are relatively shallow to constitute orifice or flow throttling passages. In the other steering direction, indentations 40, 41 and 42 are formed in the side of the return flow groove 20 to respectively establish a deep gap 44 and two throttle gaps 45 and 46 as shown in FIGS. 3 and 4. Similar sets of deep gaps and throttle gaps are formed in the same manner with respect to the other return flow grooves 21 and 22. The variable cross-sectional flow areas of the deep gap 34 and throttle gap 36 are more clearly seen in FIGS. 2 and 4 by way of example, such arrangement being applicable to the other sets of gaps.

In the neutral position of the control valve assembly as shown in FIGS. 1-4, the pressurized fluid from the pump enters the inlet bore 15, for example, and flows through control zone 28 past control edge 3 to the return groove 20. The major flow stream within the control zone 28 is conducted through the opened deep gap 34 while a small portion of the flow stream passes through the open throttle gaps 35 and 36 into the return groove 20. From the return groove 20, the fluid is conducted to the low pressure reservoir tank through radial bore 23 and central return bore 26. All flow gaps in the neutral position are dimensioned to offer no more than 1.5 to 2.0 bar of flow restriction.

Figure 6:
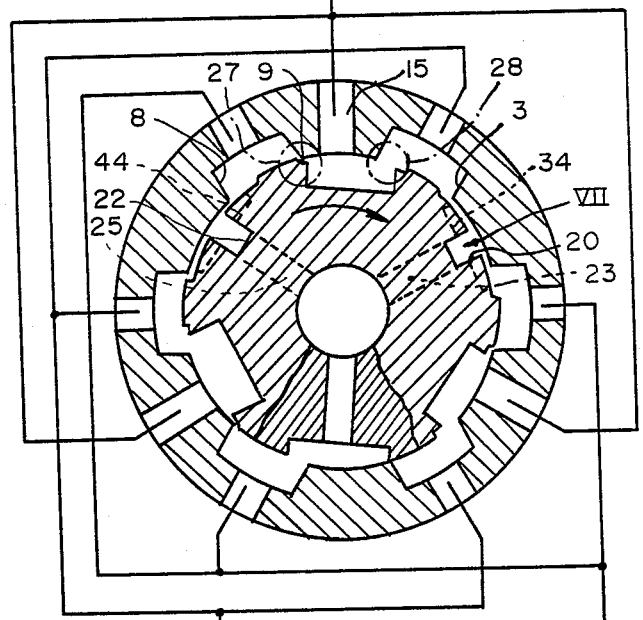
FIG. 6 is a view similar to FIG. 1 showing the valve displaced from its neutral position.
Figure 7:
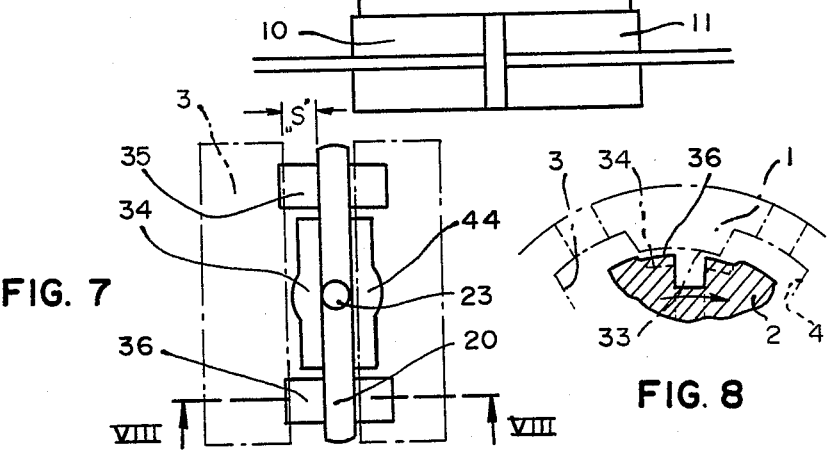
FIG. 7 is a top plane view of a portion (VII) of the valve shown in FIG. 6.
Figure 8:
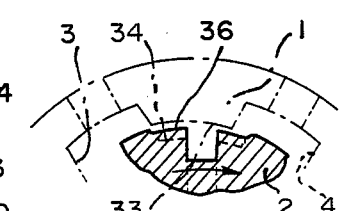
FIG. 8 is a partial section view taken substantially through a plane indicated by section line VIII—VIII in FIG. 7.

FIGS. 6–8 shows the rotary valve core member 2 rotationally displaced from neutral position relative to the valve sleeve 1 in a clockwise direction, as indicated by the arrow. With such rotation, the inlet control zone 27 between the valve core member 2 and valve sleeve 1 is gradually closed while the inlet control zone 28 is increasingly opened. The pressurized fluid delivered through inlet bore 15, will then flow through the control groove 3 to the pressure chamber 10 of the servomotor 12. Pressure regulation in such case occurs by means of the bevel control surface 9, the deep gap 34 and the two throttle gaps 35 and 36. The configuration of the curved indentation 30 of gap 34 and the bevel surface 9 achieve the desired pressure regulation as a function of valve displacement within a low pressure range of up to approximately 30 BAR. It has been empirically determined that within such low pressure range, no hissing noises occur during initial displacement of the valve and regulation of fluid flow directly into pressure relieved control groove 8 past bevel surface 9 in the inlet control zone. During such low pressure regulation, the control groove 8 receives fluid displaced from chamber 11 of the servomotor, such fluid being conducted through deep gap 44 (FIG. 7) in its wide open position into the return groove 22. From return groove 22, the fluid is conducted through bores 25 and 26 to the reservoir tank. After the flow passage in inlet control zone 27 or gap 34 is completely closed by the land portion 33 of the valve sleeve bridging grooves 3 and 4, as shown in FIG. 8, continued pressure regulation in a high pressure range above 30 BAR is exercised through throttle gaps 35 and 36 at the return groove 20. In such high pressure regulation range, hissing noises would orginarily be amplified by unrestricted return flow. However, because of the influence of the throttle gaps, hissing noises are suppressed in accordance with the present invention, as will be explained hereinafter.

As shown in FIG. 8, the deep gap 34 is completely covered to close the flow passage therethrough while a narrow passage remains open in the throttle gaps 35 and 36 to conduct restricted flow along a flow distance S as shown in FIG. 7. Restricted laminar flow of fluid thus occurs in the displaced position of the rotary valve core through the throttle gaps 35 and 36, with decreasing pressure from 100 to 20 BAR, for example, as the fluid is discharged into the return groove 20. Accordingly, any hissing noises developed will not be emitted into the return groove. Further, the flow distance of the throttle gaps and the throttle action thereof is increased with rotational displacement of the rotary valve member 2 from the neutral position to maintain noise suppression until maximum pressure is attained with complete closing of the restricted passages of the throttle gaps.

It will be apparent that the foregoing operational description involving a pair of inlet control zones 27 and 28 and associated control grooves 3 and 4, will also be applicable to the pairs of inlet control zones associated with the two other pairs of control grooves 5–6 and 7–8 in the valve sleeve.

We claim:

1. A hydraulic control valve for a vehicle steering system, comprising a sleeve having a first set of longitudinally extending grooves formed therein and separated by lands, a valve core within the sleeve and relatively rotatable therein, a second set of longitudinally extending grooves, also separated by lands, on the valve core, each groove of the first set lying opposite to a land of the second set, means to conduct hydraulic fluid under pressure into and out of said grooves and flow regulating means responsive to relative rotation between the valve core and the sleeve for varying effective width and therefore area of orifices between adjacent edges of opposing grooves and lands to control restriction to flow of hydraulic fluid within the valve and thus the power assistance provided to the system, said flow regulating means including relatively unrestricted passage means through which return flow of the fluid is conducted with increasing restriction during initial rotation of the valve core from a neutral position for pressure regulation within a lower pressure range, and throttling passage means spaced from the relatively unrestricted passage means through which the return flow of the fluid is restrictively conducted for damping of noises and continued pressure regulation in a higher pressure range during further rotation from the netural position.

2. In a control valve of the rotary type for hydraulic auxiliary power steering of motor vehicles, having a valve sleeve (1) encompassing a rotary plug (2) for controlling pressurized flow and return flow of fluid, said valve sleeve and rotary plug having coacting grooves and forming inlet flow control gaps therebetween with gap edges on the rotary plug provided with flow control bevels (9,19), whereby a substantially open passage conducts said pressurized flow to and said return flow from the control valve in a neutral position of the rotary plug while a portion of the pressurized flow pressurizes a servomotor chamber with predetermined regulation at one of the gap edges depending on direction of rotation of the rotary plug from the neutral position to a rotated position; the improvement residing in: one of the coacting grooves (20) being located downstream of one of the gap edges on the rotary plug, said inlet flow control gaps including a relatively deeper gap (34) to which said one of the coacting grooves is exposed in either of said directions of rotation of the rotary plug and relatively shallower throttle gaps (35, 36) spatially separated from the deeper gap, said throttle gaps being longer in peripheral flow direction than the deeper gap.

3. The control valve as defined in claim 2, wherein the throttle gaps form peripheral passages between the rotary plug and the valve sleeve on opposite sides of the deeper gap.

4. The control valve as defined in claim 2, wherein one of the throttle gaps (36) conducts said return flow from the servomotor chamber in one of the rotated positions of the rotary plug.

5. The control valve as defined in claim 2, wherein said rotary plug (2) is formed with a central bore (26) and a radial bore (23) extending between the central bore and said one of the coacting grooves (20) to form a return passage conducting said return flow of the fluid.

6. The control valve as defined in claim 2, wherein the deeper gap (34) extends arcuately in the direction of rotation of the rotary plug.

7. The control valve as defined in claim 3, wherein one of the throttle gaps (36) conducts said return flow, through the peripheral passage formed thereby, from the servomotor chamber in one of the rotated positions of the rotary plug.

* * * * *